UNITED STATES PATENT OFFICE 1,982,661

FLUORINATED ARYLAMIDES

Emmet F. Hitch and Miles A. Dahlen, Wilmington, Del., and Martin E. Friedrich, Carneys Point, N. J., assignors to E. I. du Pont de Nemours & Company, Wilmington, Del., a corporation of Delaware No Drawing. Application July 27, 1933, Serial No. 682,462

10 Claims. (Cl. 260—124)

This invention relates to the manufacture of new organic compounds, and more particularly refers to the production of intermediates of great value as ice color coupling components.

It is an object of this invention to prepare new organic compounds having a variety of uses. A further object is to prepare fluorinated arylamides of 2,3-hydroxy-naphthoic acid. A still further object is to prepare intermediates especially adapted for use in the manufacture of azo dyes. Additional objects will become apparent from a consideration of the following description.

These objects are attained according to the present invention which in its preferred embodiment comprises reacting 2-3-hydroxy-naphthoic acid with a fluorinated arylamine in the presence of a dehydrating agent, such as phosphorous trichloride or thionyl chloride.

The invention may be more completely understood by a consideration of the following illustrative examples, in which the quantities are stated in parts by weight:

Example 1

A mixture of 56 parts of p-fluoroaniline, 92 parts of 2,3-hydroxy-naphthoic acid and 970 parts of toluene were warmed to about 50° C. with vigorous agitation. 26 parts of phosphorous trichloride were then added slowly to the charge, at 50–60° C. The mass was then warmed slowly to the reflux point, where it was held for about 18 hours. When the evolution of hydrochloric acid ceased, the charge was cooled to about 80° C. A dilute solution of soda ash was then added to neutralize the phosphorous acid remaining in the charge, and the toluene was removed by steam distillation. When the toluene had been distilled completely, the charge was cooled, the precipitated arylamide filtered, washed with water, and dried.

The product may be purified by dissolving in caustic soda solution, adding decolorizing charcoal, filtering, and reprecipitating by the addition of a dilute solution of sodium bicarbonate. The 2,3-hydroxy-naphthoyl derivative of p-fluoro-aniline obtained in this manner had a melting point of 264.5–265.5° C. It has the probable formula:

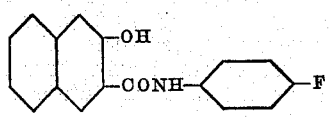

Example 2

33 parts of 2,5-difluoro-aniline, 57 parts of 2-3-hydroxy-naphthoic acid, and 660 parts of toluene were heated to 50° C. 15 parts of phosphorous trichloride were then added slowly, with agitation. The charge was heated gradually to 110° C. and refluxed for about 20 hours. The charge was then cooled, filtered, and the precipitate washed with hot dilute sodium bicarbonate solution until a small sample of the washings gave no precipitate on acidification. The charge was then washed with water until all alkalies were removed and dried. A yield of about 90% of the theory was obtained in this manner. The material has the probable formula:

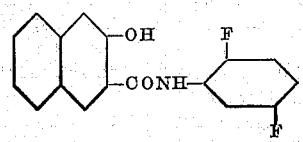

Example 3

17 parts of o-fluoroaniline, 28 parts of 2,3-hydroxy-naphthoic acid, and 880 parts of toluene, were mixed and heated at the boiling point until the distillate was clear (to remove moisture). The charge was then cooled to about 50° C. At this point light green crystals (probably the 2-3-hydroxy-naphthoic acid salt of o-fluoroaniline) were formed. At 50–55° C., 9 parts of phosphorous trichloride were added, with agitation. The charge was heated to the reflux point, and held at this temperature for about 20 hours. A clear solution resulted soon after the refluxing period started. The charge was then cooled to about 80° C. and a solution of sodium bicarbonate added to neutralize the acidity present. The toluene was then removed by steam distillation and the suspension of the 2,3-hydroxy-naphthoyl derivative of o-fluoroaniline was then filtered and washed well with water. The yield was 90–95% of the theory. The melting point of the material was 226–228° C. It has the probable formula:

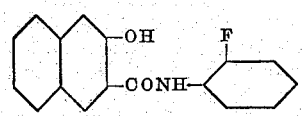

Example 4

10 parts of 2,3-hydroxy-naphthoic acid, 200 parts of toluene, 7 parts of 3-fluor-4-methoxy-aniline, and 3.3 parts of phosphorous trichloride were refluxed and agitated for about 20 hours. The charge was then cooled to about 20° C., filtered, and the precipitate washed with cold alcohol until a small sample dissolved completely to a clear solution in dilute alcoholic caustic soda. An excellent yield of the arylamide of the probable formula:

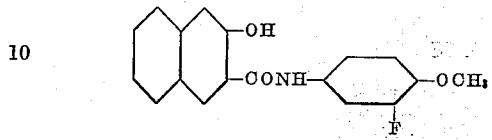

was obtained.

It is, of course, apparent that this invention is capable of considerable modification and variation in the manner of its practical application. For example, numerous inert solvents may be utilized in addition to or in place of those formerly mentioned. Among the solvents which may be used with good results mention may be made of toluene, chlorobenzene, nitrobenzene, etc.

Likewise, various dehydrating agents may be used such as thionyl chloride, phosphorous trichloride, phosphorous pentachloride and similar well known reagents. The dehydrating agent should preferably not react with the solvent. Consequently, in selecting suitable solvents and dehydrating agents for use in this connection it is in general advisable that the solvent be inert towards the dehydrating agent.

The fluorinated arylamines which come within the scope of this invention are too numerous to describe individually. However, in order to amplify the aforementioned instructions the following representative arylamines will be given:

(1) Fluorinated naphthylamines; such as 1-fluoro-2-naphthylamine, 1 - fluoro -4- naphthylamine, 1-fluoro-5-naphthylamine, and 6-fluoro-2-methoxy-1-naphthylamine.

(2) Fluorinated toluidines; such as 6-fluoro-2-amino-toluene, 5-fluoro-2-amino-toluene, 2-fluoro-4-amino-toluene, 6-fluoro-3-amino-toluene.

(3) Fluorinated anisidines, phenetidines, and other alkoxy- and aryloxy-anilines; such as 4-fluoro-2-amino-anisole, 5-fluoro-2-amino-phenetole, 4-fluoro-2-amino-diphenylether, 2,5-dimethoxy-4-fluoro-aniline, 4-fluoro-3-methyl-6-methoxy-aniline.

(4) Fluorinated xylidines; such as 4-fluoro-5-amino-1,3-dimethyl-benzene, 6-fluoro-4-amino-1,3-dimethyl-benzene, 4-fluoro-2,5-dimethylaniline.

(5) Fluorinated halogeno-anilines; such as 5-chloro-2-fluoro-aniline, 2,5-difluoro-aniline, 4-bromo-2-fluoro-aniline, 2 - fluoro - 4 - chloro-5-methoxy-aniline.

(6) Fluoro-nitranilines; such as 4-fluoro-2-nitraniline, 2-fluoro-5-nitraniline, 2-fluoro-4-methyl-6-nitraniline.

(7) Fluoro-amino-anthracenes, fluoro-amino-phenanthrenes, fluoro-amino-diphenyls, fluoro-amino - azobenzenes, fluoro - amino - carbazoles, fluoro-amino-quinolines, fluoro-amino-acridines, fluoro-amino - benzothiazoles, fluoro - amino-indols, fluoro-amino-benzoxazoles, and other fluorinated arylamines of polynuclear systems.

(8) Fluoro-amino-benzotrifluorides; such as 2-fluoro-5-amino-benzo-trifluoride.

It is to be understood that where a fluorinated arylamine is referred to in the present specification and claims it is intended to include those arylamines having substituted thereon more than one fluorine atom.

The arylamides after formation are isolated and purified according to various methods. For instance, the solvent may be separated from the resultant arylamide by steam distillation, the arylamide remaining suspended in the aqueous residue. It may then be separated therefrom by filtration. In order to purify the thus separated product, it may be crystallized from a suitable solvent, such solvents being well known to one skilled in the art. Another method which is quite efficacious in many cases is to cool the reaction solution and separate the desired arylamide therefrom merely by filtration. This latter method eliminates the disadvantages of the steam distillation method due to hydrolysis of the product, and to contamination of such product with deleterious by-product which cannot be removed in the distillation process.

It is to be understood that the fluorinated arylamine may have one or more additional substituents substituted thereon. Since the arylamides described herein are of considerable importance in the manufacture of ice colors, as described in a copending application, it is advisable that they be free of water-solubilizing groups when used for this purpose. Examples of water-solubilizing groups from which the arylamide should be free when used for the aforementioned purpose are the carboxylic and sulfonic acid groups. With the exception of water-solubilizing groups, however, one or more of the numerous well known substituents may be substituted thereon without detracting from the advantageous results.

The desired arylamides may be produced by well known processes. The preferred method is that which comprises briefly reacting 2,3-hydroxy-naphthoic acid or suitable substituted derivatives thereof with the fluorinated arylamine which may be suspended in an inert solvent, such as toluene, chlorobenzene, xylene, and tetrachloroethane. The suspension or solution formed thereby is then treated with a dehydrating agent, preferably phosphorus trichloride or thionyl chloride. After dehydration is completed an acid binding agent, such as sodium bicarbonate or sodium carbonate, is added to neutralize any acidity, the solvent then being removed as previously described.

Another method of forming the arylamides described herein is to react for example 2,3-hydroxy-naphthoyl chloride with a fluorinated arylamine. The naphthoyl chloride may be prepared according to standard reactions, for instance by the action of thionyl chloride on 2,3-hydroxy-naphthoic acid suspended in an inert solvent. It may, likewise, be prepared by the action of thionyl chloride, phosphorus trichloride, phosphorus pentachloride, or similar reagents upon solid 2-3-hydroxy-naphthoic acid or salts thereof. The condensation of the naphthoyl chloride and fluorinated arylamine is preferably effected in an inert solvent at elevated temperatures. It may, likewise, be effected by suspending the arylamine in water in the presence of an acid binding agent, and treating with 2,3-hydroxy-naphthoyl chloride, the latter being added as a solid or in solution in a suitable solvent. Isolation of the product is usually accomplished by steam distillation or by cooling and filtering.

The arylamides described herein are suitable for numerous purposes, chief among which is their use as intermediates in the preparation of ice colors. The dyes and pigments produced therefrom are in general quite fast to light and washing. Likewise, they have bright attractive shades which are of great commercial interest. In addition they are adapted for use in many other connections wherein arylamides of the prior art were formerly utilized.

As many apparently widely different embodiments of this invention may be made without departing from the spirit and scope thereof, it is to be understood that the invention is not limited to the specific embodiments thereof except as defined in the appended claims.

We claim:

1. A process for making arylamides which comprises condensing 2,3-hydroxy-naphthoic acid with a fluorinated arylamine in the presence of a dehydrating agent.

2. A process for making arylamides which comprises condensing 2,3-hydroxy-naphthoic acid with a fluorinated arylamine in the presence of a dehydrating agent selected from the group consisting of phosphorous halides and thionyl halides.

3. A process for making arylamides which comprises condensing 2,3-hydroxy-naphthoic acid with a fluorinated arylamine selected from the group consisting of arylamines of the benzene and naphthalene series which may have substituted thereon alkyl, aralkyl, alkoxy, aryloxy, halogen and nitro groups, in the presence of an inert solvent and a dehydrating agent selected from the group consisting of phosphorous trichloride and thionyl chloride.

4. A process for making water-insoluble arylamides which comprises condensing 2,3-hydroxy-naphthoic acid with a fluorinated arylamine of the benzene series which may have substituted thereon members selected from the class consisting of alkyl, alkoxy, halogen and nitro groups, in the presence of toluene and phosphorous trichloride.

5. Arylamides of 2,3-hydroxy-naphthoic acid having the following general formula:

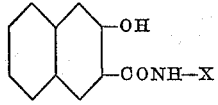

in which X represents the radical of a fluorinated arylamine.

6. Arylamides of 2,3-hydroxy-naphthoic acid having the following general formula:

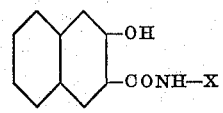

in which X represents the radical of a fluorinated arylamine of the benzene or naphthalene series.

7. The arylamides of claim 6 wherein the radical represented by X may have substituted thereon non-water-solubilizing groups.

8. Water-insoluble arylamides of 2,3-hydroxy-naphthoic acid having the following general formula:

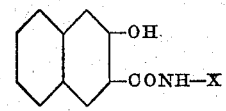

in which X represents the radical of a fluorinated arylamine of the benzene or naphthalene series.

9. Water-insoluble arylamides of 2,3-hydroxy-naphthoic acid having the following general formula:

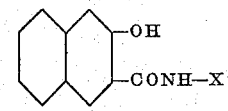

in which X represents the radical of a fluorinated arylamine of the benzene series which may have substituted thereon members selected from the class consisting of alkyl, alkoxy, halogen and nitro groups.

10. Water-insoluble arylamides of 2,3-hydroxy-naphthoic acid having the following general formula:

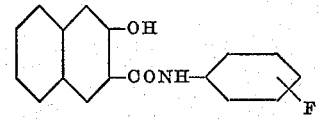

EMMET F. HITCH.
MILES A. DAHLEN.
MARTIN E. FRIEDRICH.